CONVEYER SWITCHING SYSTEM

Filed March 11, 1946 3 Sheets-Sheet 1

DIVISION "Y"

DIVISION "X"

INVENTOR.
KURT MULLERHEIM

BY *Chas. W. Candy*

ATTORNEY

INVENTOR.
KURT MULLERHEIM

BY
[signature]
ATTORNEY

CONVEYER SWITCHING SYSTEM

Filed March 11, 1946 3 Sheets-Sheet 3

INVENTOR.
KURT MULLERHEIM
BY Wm. Walter Owen
ATTORNEY

Patented Oct. 21, 1952 2,614,506

UNITED STATES PATENT OFFICE 2,614,506

CONVEYER SWITCHING SYSTEM

Kurt Mullerheim, New York, N. Y., assignor to Automatic Electric Laboratories, Inc., Chicago, Ill., a corporation of Delaware Application March 11, 1946, Serial No. 653,513

8 Claims. (Cl. 104—88)

Figure 1:
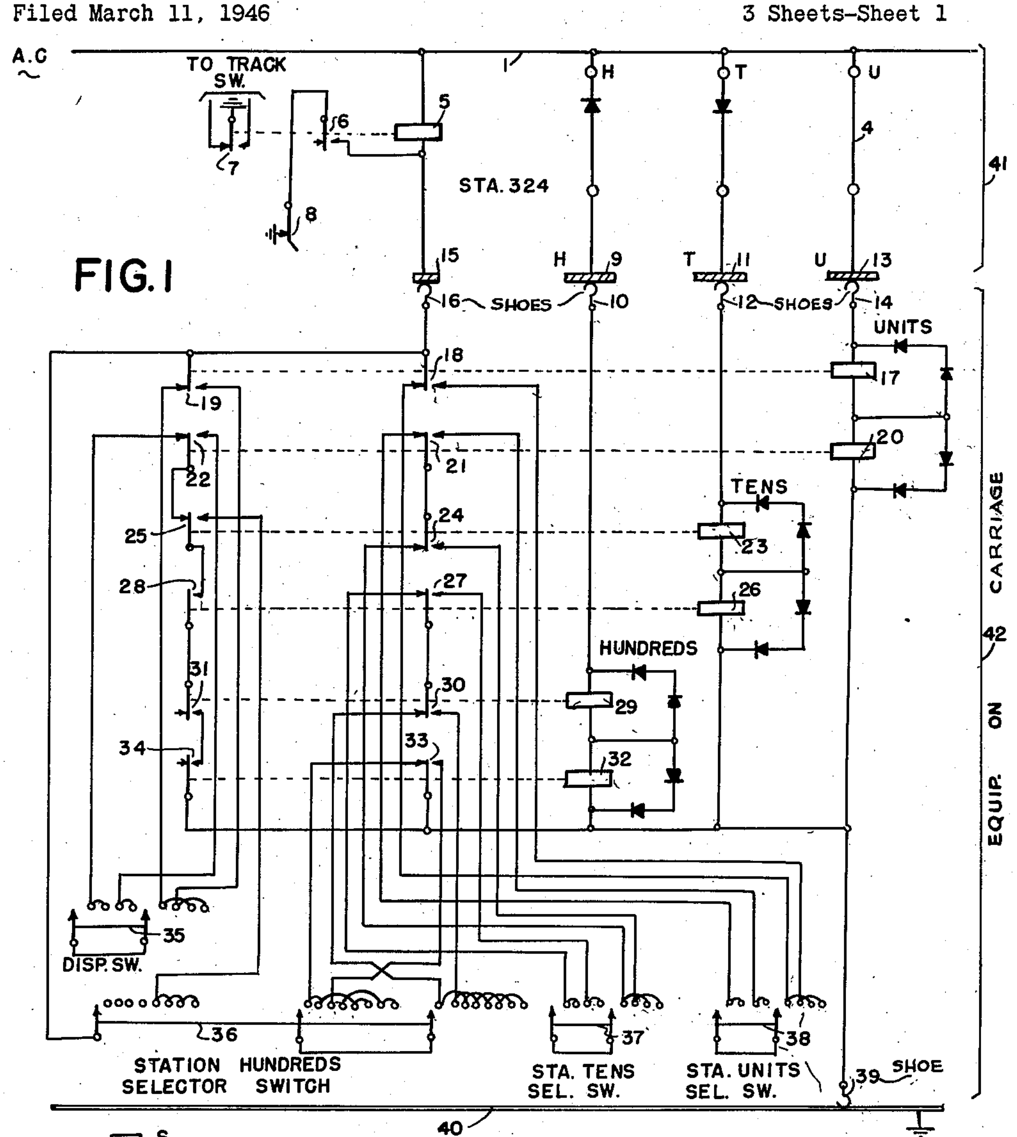

This invention relates to conveyor systems, and particularly to electrically operated conveyor systems such as commonly used in various types of industrial establishments for the transportation of goods and materials from point to point. It is directed particularly to an overhead monorail system or the like in which one or more self-propelled carriers or vehicles operate over a closed track from one or more loading or dispatching stations to a plurality of unloading or handling stations, and back to the dispatching stations for re-use. The dispatching and handling stations are preferably located on individual sidings or branch tracks, so as not to interfere with the free passage of vehicles bound for other points in the system.

In such a system each carrier or vehicle is provided with a driving motor, electrically operated from a trolley or bus paralleling the track. If this bus be divided into separate blocks or sections, said vehicles may readily be stopped in any section by remote control, from a central point, by disconnecting the power from the bus of said section. Where branch tracks and electrically operated track switches are employed, remote control of the track switches from a central point is also possible. This may not be practical for an extensive system with many stations however, where the entire system may not be visible from a central point, or where dispatching information is not available at a common point.

The main object of my invention, is therefore the provision of a simple self-switching and control means for such a system wherein the various vehicles automatically switch themselves into the various branch tracks or sidings as required, by automatically operating the associated track switches upon arrival thereat, in accordance with simple adjustments made on said vehicle before its departure.

Another object of my invention is the utilization of the same means for causing said vehicles to stop automatically at a particular handling station as predetermined, in cases where two or more such stations may be provided in a single branch track or siding.

A further object of my invention is the utilization of the same or similar means for causing said vehicles to switch themselves automatically into a particular dispatching station branch track, on arriving thereat, which may or may not be the same branch track from which it was originally dispatched. Still another object is the provision of a system of large capacity and flexibility with a minimum of trackside control equipment, and a minimum of line conductors between the various points of the system.

One feature of the invention, to which the system owes much of its capacity, flexibility and simplicity, is the provision on each vehicle of a small group of primary control relays capable of being operated in a large number of combinations by a small number of trackside contact plates or buses at each track-switch or station location, as the vehicle arrives at said locations. Contacts on the relays are operated in corresponding combinations to prepare circuits for the operation of the corresponding track switches or other trackside equipment, as required.

Another feature is the arrangement of the relays in groups corresponding to the digits of a number characterizing each branch and station location.

Another feature is the manner in which the relay-controlling trackside contact plates are marked with various electrical potentials from a single source of alternating current, by means of simple cross connections and the use of dry disc rectifiers.

Still another feature is the provision on the outside of each vehicle of a number of multi-point, hand-operated switches, which may be quickly and easily adjusted by a dispatcher before the vehicle's departure from his station, to preselect one or more of the aforementioned circuits through the contacts of the relays, to cause the operation of predetermined track switches or other trackside equipment, for the guidance of said vehicle, whereby it may be caused to direct itself to any desired handling station and to return to any desired dispatching station.

Other objects and features of the invention will be apparent from the following description and claims, and from the accompanying drawings comprising Figures 1 to 6, inclusive, which are also a part of the specification.

Figure 2:
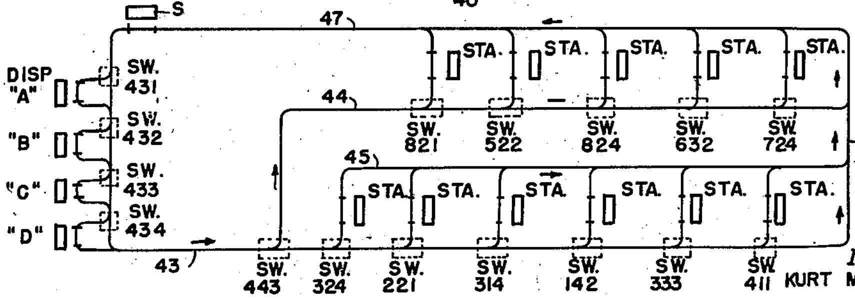

With reference to the drawings, Figure 1 shows the circuit arrangement for one embodiment of the invention, and Figure 2 a typical schematic track layout for such a system, in which the handling branch tracks are arranged in two divisions, with a single station per branch track.

Figure 3:
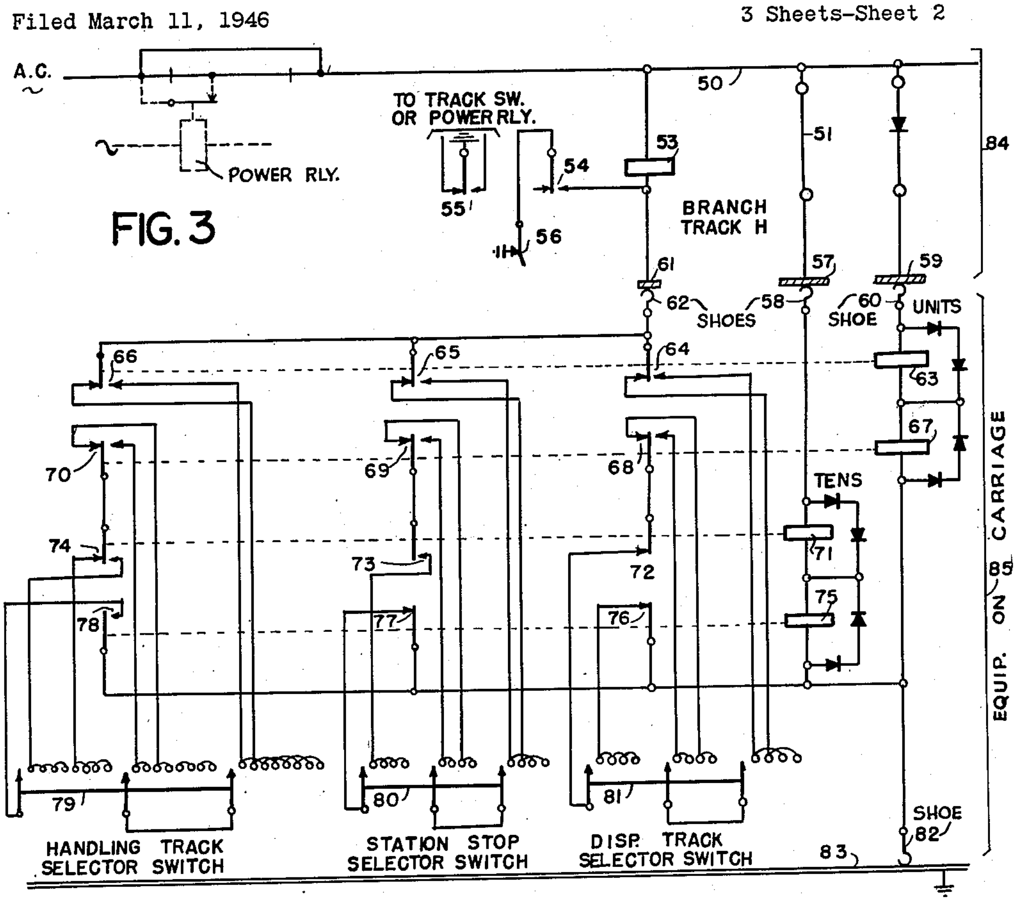
Figure 4:
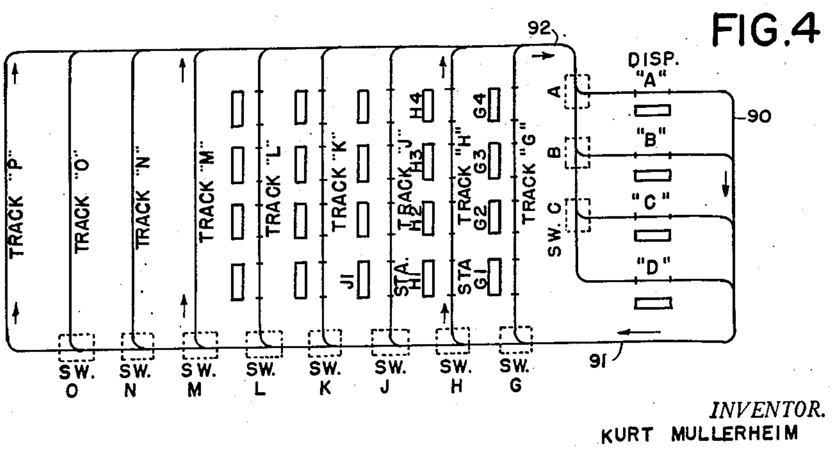
Figure 5:
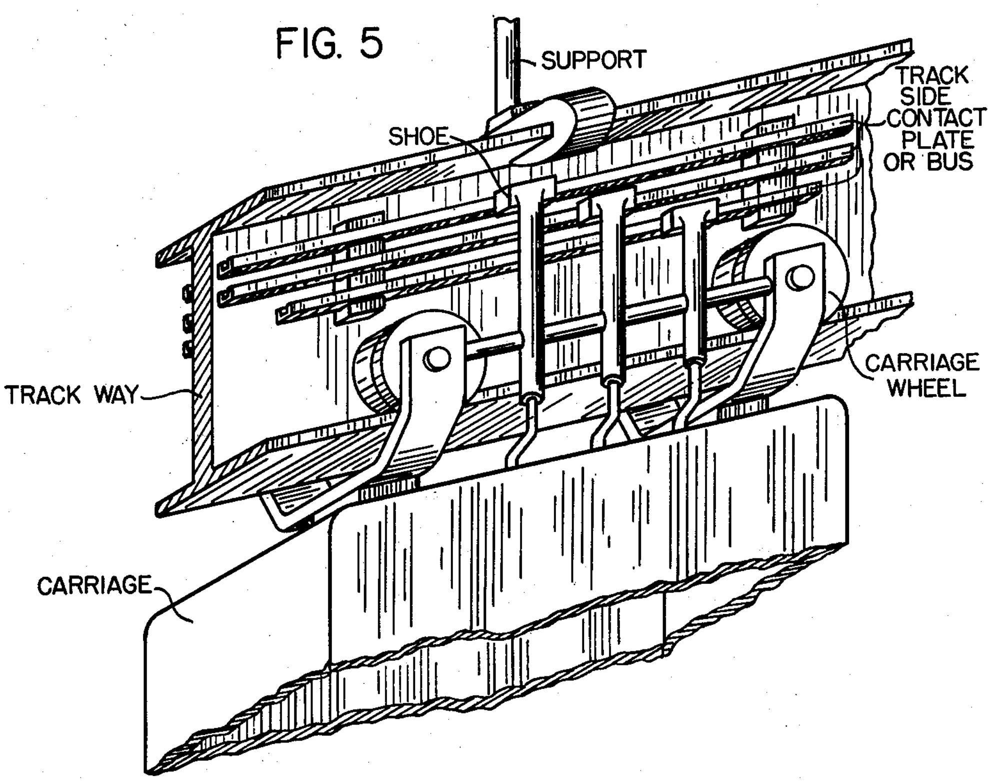
Figure 6:
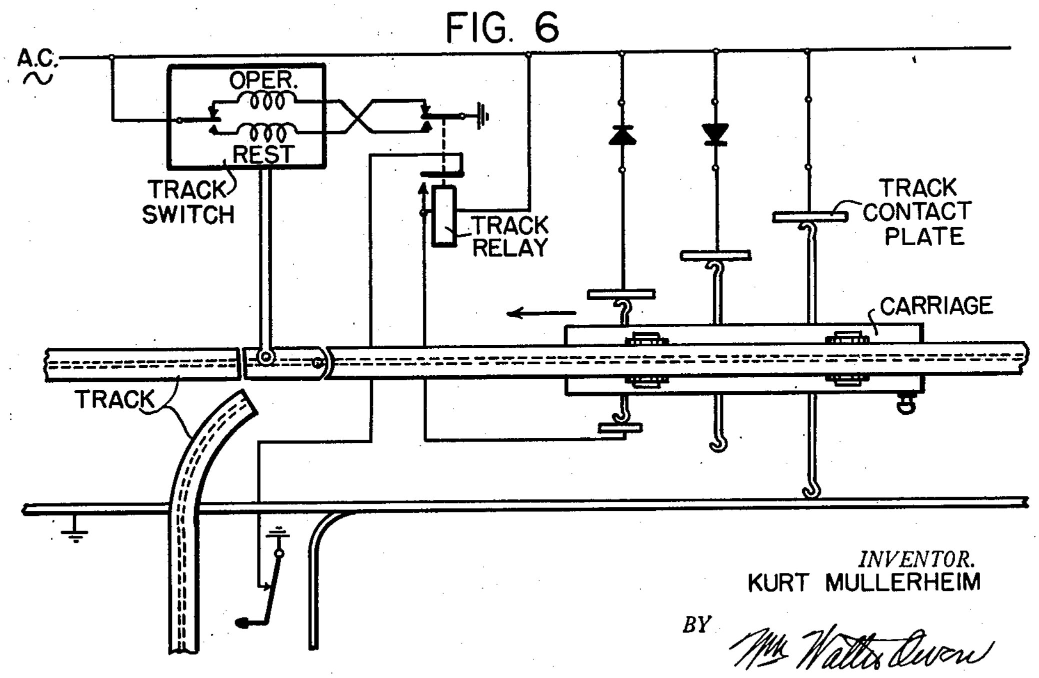

Figure 3 shows a modified circuit arrangement for cases where two or more stations are required in each branch track, and Figure 4 is a typical track layout for such a system. These arrangements are of course merely representative, and are subject to an almost limitless number of variations, as will be apparent on further study. Figure 5 shows a diagonal side view of a section of track for a typical monorail conveyor system with a carriage in place, and Figure 6 is a schematic plan diagram of a switch location, showing a siding entrance with track switch and contact plates and an approaching carriage. It will be understood that other forms of track and carriage may be used if desired.

In Figure 1, the trackway equipment directly involved in the invention, is shown in the upper part of the drawing, encompassed by the bracket 41. This represents the equipment for a single branch track or station such as station 324, indicated on the lower left in Figure 2. The related equipment carried by the vehicle, which is identical for each vehicle, is indicated by the bracket 42.

In the trackway equipment 41, the trackside contact plates are indicated by the numerical designations 9, 11, 13 and 15. The operating or switching contact plate 15 is shown connected to one side of a trackside relay 5, the other side of which is permanently connected to a common source of alternating current, by way of the common conductor 1. Relay 5 is normally provided with locking contacts 6, and operating contacts 7 which control the track switch. Contacts 8 are a special pair of break contacts located in the trackway beyond the track switch, and are operated by the vehicle as it passes, to release relay 5 and thereby re-set the track switch for the main track, after the vehicle has passed into the branch track.

The combination contact plates comprising the hundreds marking plate 9, the tens marking plate 11, and the units marking plate 13, may be left open, or may be cross-connected to conductor 1 in various ways by means of a direct strap or jumper such as 4, or by special straps such as 2 and 3, comprising dry disc rectifiers in series, and poled as required. As shown, the strap 4 for example, will connect an alternating voltage to plate 13, while strap 3 will connect a positive direct current voltage to plate 11, and strap 2 a negative direct current voltage to plate 9, it being assumed that current will flow freely through the rectifier discs in the direction indicated by the arrow heads, and only to an insignificant degree in the opposite direction. It is thus apparent that any one of the three marking plates at any station may be marked with any one of four voltage conditions, namely: (1) No voltage; (2) Alternating voltage; (3) Positive direct current voltage; (4) Negative direct current voltage. With three marking plates, this makes a total of 4×4×4 or 64 possible combinations. Similarly, with four marking plates per station, 4×4×4×4 or 256 combinations would be possible, and so on. Even this however, does not define the ultimate capacity of the system, since, by dividing the branch tracks into divisions, the basic capacity of the system is increased in direct multiples, less the number of divisions, as will be shown. Actually, it is proposed to utilize only 63 combinations in all, omitting the 1—1—1, or "all-relays-normal" combination. Also, some combinations will need to be reserved for dispatching station use.

In the vehicle-borne equipment 42, the combination relays 32 and 29 are connected in series with the "hundreds" collector shoe 10, the combination relays 26 and 23 are in series with the "tens" collector shoe 12, and the combination relays 20 and 17 are connected to the "units" collector shoe 14. The other side of each pair of these relays is shown connected to a common collector shoe 39, which normally rides on the ground bus 40, which is also the other side of the alternating current source associated with conductor 1. A ground through the wheels of the vehicle and the track, could be substituted for collector 39 and bus 40, of course.

The rectifier discs shown associated with each pair of relays, are so poled, that alternating current will operate both relays, while direct current of one polarity will operate only the upper relay of a pair, and direct current of the opposite polarity will operate only the lower relay of the pair. Thus, in the arrangement illustrated for station 324, with alternating current connected to collector shoe 14 by the marking plate 13, relay 17 will be energized on the positive half cycles in series with the lower rectifier discs which now shunt the lower relay, and relay 20 will operate on the negative half cycles in series with the upper rectifier discs which now shunt the upper relay. Both relays therefore operate. In a similar manner, the positive half cycles of current connected to collector shoe 12 by the marking plate 11 will operate relay 23 but not relay 26, while the negative half cycles of current connected to collector shoe 10 through the marking plate 9, will operate relay 32 but not relay 29.

The contacts, such as 18, 19 etc. of these combination relays, are arranged in a plurality of circuits corresponding to the various combinations. One side of these circuits, all of which are open when the control or selector switches 35, 36, 37 and 38 are unoperated, is connected to the operating or switching collector shoe 16, which controls the trackside relay 5, while the other side is connected to the ground return collector shoe 39.

The selector switches 35, 36, 37 and 38, which are mounted on the outside of the vehicle in an accessible position for quick and easy operation, are gang-type, hand-rotatable contact switches having two or three contact arms which move as a unit, and each having also a pointer and a numbered dial, to facilitate setting the switches. Switch 35 is the dispatcher selector switch which may be set in any one of four off-normal positions to select one of the dispatchers A, B, C or D of Figure 2. This switch may be preset by the dispatchers themselves or, under some conditions of operation, may be set by a supervisor located near the dispatching stations who will distribute the returning vehicles among the available dispatchers as required. Switches 36, 37 and 38 are the station selector switches by means of which any handling station can be selected according to its assigned three-digit number. The hundreds switch 36 may be set to any one of eight off-normal positions, the first four of which will select a handling station in the lower division X of Figure 2, and the last four of which will automatically select a station in the upper division Y. Switches 37 and 38 may be set to any one of four off-normal positions, to select the tens and units digits, which are common to both divisions.

Figure 2 is a one-line diagram of a track layout for use with Figure 1, around which the vehicles or carriers move in an anti-clockwise direction as indicated by the small arrows. On the left are four dispatcher's branch tracks with their entrance switches 431, 432, 433 and 434, giving access to dispatchers A, B, C and D respectively. A supervisor's post is indicated at S. A portion of the handling stations are shown on the right, each on an individual branch track, with separate entrance switches, as shown. These stations have been divided into two divisions X and Y, with access to the two divisions controlled by the common entrance switch 443. If this switch is operated, by an approaching vehicle, the vehicle will be directed to division Y; otherwise, it will proceed straight ahead, to division X.

The three-digit station numbers may be assigned without regard to their order of appearance in the track system, except that stations in division X are assigned hundreds digits "1," "2," "3" or "4," and stations in division Y are assigned hundreds digits "5," "6," "7" or "8." Thus, when the hundreds selector switch 36 is set to position "5," "6," "7" or "8," switch 443 will be operated by the vehicle, through the left hand contact arm of switch 36, as will be shown. The proper station switch will also be operated, in due course, through the other contact arms on switches 36, 37 and 38. The capacity of each division is the full number of possible combinations less only those numbers assigned to or reserved for present and future dispatcher's stations and division switches. For a layout like Figure 2, a total of 55 stations per division could be readily achieved with room for growth, including two additional dispatchers and one additional division, as shown in the Table II following. Adding dispatchers however, would require a change in the dispatcher selector switch 35 and the associated circuits, while adding another division would require a change in the left hand portion of the hundreds selector switch and its associated circuits.

In the drawings, it is assumed that the trackside combination contact plates such as 9, 11 and 13, and the alternating current source, at each station, are connected to opposite sides of a screw or bolt type terminal frame, having the required number of pairs of terminals, as shown in Figs. 1, 3 and 6, at the upper right. For convenience in re-numbering, in case of expansions or re-arrangements of the system, these terminals would then be connected by prepared jumpers, or straps, or strappings, consisting for example, in the illustrated embodiment of the invention, of plain copper wire, or wire in series with a metallic disc rectifier, all such prepared strappings being of the same length and equipped with terminal lugs, which would be connected in place merely by clamping under the proper terminal screw or nut. Changing a number would then be a very simple matter of changing or perhaps reversing one or more of these strappings. In the tables which follow, the terms "Arrow Up" and "Arrow Down" refer simply to the polarity of these terminal block rectifiers, shown on the drawings as large arrow heads.

Table I following gives the number key assumed for the stationary trackside cross-connections to the marking plates at the various switch locations, while Table II gives the complete numbering scheme assumed for Figure 2.

TABLE I

*Trackside strapping*

| Strapping | Hun. Digit | Tens Digit | Units Digit |
|---|---|---|---|
| Open | 1 or 5 | 1 | 1 |
| Arrow Down | 2 or 6 | 2 | 2 |
| Arrow Up | 3 or 7 | 3 | 3 |
| Direct Strap | 4 or 8 | 4 | 4 |

TABLE II

| Hun. Digit | | Tens Digit | Units Digit | Use | Relays Operated |
|---|---|---|---|---|---|
| Div. X | Div. Y | | | | |
| 1 | 5 | 1 | 1 | ---------- | ---------- |
| 1 | 5 | 1 | 2 | Sta | 17 |
| 1 | 5 | 1 | 3 | Sta | 20 |
| 1 | 5 | 1 | 4 | Sta | 20, 17 |
| 1 | 5 | 2 | 1 | Sta | 23 |
| 1 | 5 | 2 | 2 | Sta | 23, 17 |
| 1 | 5 | 2 | 3 | Sta | 23, 20 |
| 1 | 5 | 2 | 4 | Sta | 23, 20, 17 |
| 1 | 5 | 3 | 1 | Sta | 26 |
| 1 | 5 | 3 | 2 | Sta | 26, 17 |
| 1 | 5 | 3 | 3 | Sta | 26, 20 |
| 1 | 5 | 3 | 4 | Sta | 26, 20, 17 |
| 1 | 5 | 4 | 1 | Sta | 26, 23 |
| 1 | 5 | 4 | 2 | Sta | 26, 23, 17 |
| 1 | 5 | 4 | 3 | Sta | 26, 23, 20 |
| 1 | 5 | 4 | 4 | Sta | 26, 23, 20, 17 |
| 2 | 6 | 1 | 1 | Sta | 29 |
| 2 | 6 | 1 | 2 | Sta | 29, 17 |
| 2 | 6 | 1 | 3 | Sta | 29, 20 |
| 2 | 6 | 1 | 4 | Sta | 29, 20, 17 |
| 2 | 6 | 2 | 1 | Sta | 29, 23 |
| 2 | 6 | 2 | 2 | Sta | 29, 23, 17 |
| 2 | 6 | 2 | 3 | Sta | 29, 23, 20 |
| 2 | 6 | 2 | 4 | Sta | 29, 23, 20, 17 |
| 2 | 6 | 3 | 1 | Sta | 29, 26 |
| 2 | 6 | 3 | 2 | Sta | 29, 26, 17 |
| 2 | 6 | 3 | 3 | Sta | 29, 26, 20 |
| 2 | 6 | 3 | 4 | Sta | 29, 26, 20, 17 |
| 2 | 6 | 4 | 1 | Sta | 29, 26, 23 |
| 2 | 6 | 4 | 2 | Sta | 29, 26, 23, 17 |
| 2 | 6 | 4 | 3 | Sta | 29, 26, 23, 20 |
| 2 | 6 | 4 | 4 | Sta | 29, 26, 23, 20, 17 |
| 3 | 7 | 1 | 1 | Sta | 32 |
| 3 | 7 | 1 | 2 | Sta | 32, 17 |
| 3 | 7 | 1 | 3 | Sta | 32, 20 |
| 3 | 7 | 1 | 4 | Sta | 32, 20, 17 |
| 3 | 7 | 2 | 1 | Sta | 32, 23 |
| 3 | 7 | 2 | 2 | Sta | 32, 23, 17 |
| 3 | 7 | 2 | 3 | Sta | 32, 23, 20 |
| 3 | 7 | 2 | 4 | Sta | 32, 23, 20, 17 |
| 3 | 7 | 3 | 1 | Sta | 32, 26 |
| 3 | 7 | 3 | 2 | Sta | 32, 26. 17 |
| 3 | 7 | 3 | 3 | Sta | 32, 26, 20 |
| 3 | 7 | 3 | 4 | Sta | 32, 26, 20, 17 |
| 3 | 7 | 4 | 1 | Sta | 32, 26, 23 |
| 3 | 7 | 4 | 2 | Sta | 32, 26, 23, 17 |
| 3 | 7 | 4 | 3 | Sta | 32, 26, 23, 20 |
| 3 | 7 | 4 | 4 | Sta | 32, 26, 23, 20, 17 |
| 4 | 8 | 1 | 1 | Sta | 32, 29 |
| 4 | 8 | 1 | 2 | Sta | 32, 29, 17 |
| 4 | 8 | 1 | 3 | Sta | 32, 29, 20 |
| 4 | 8 | 1 | 4 | Sta | 32, 29, 20, 17 |
| 4 | 8 | 2 | 1 | Sta | 32, 29, 23 |
| 4 | 8 | 2 | 2 | Sta | 32, 29, 23, 17 |
| 4 | 8 | 2 | 3 | Sta | 32, 29, 23, 20 |
| 4 | 8 | 2 | 4 | Sta | 32, 29, 23, 20, 17 |
| 4 | -------- | 3 | 1 | Disp. "A" | 32, 29, 26 |
| 4 | -------- | 3 | 2 | Disp. "B" | 32, 29, 26, 17 |
| 4 | -------- | 3 | 3 | Disp. "C" | 32, 29, 26, 20 |
| 4 | -------- | 3 | 4 | Disp. "D" | 32, 29, 26, 20, 17 |
| 4 | -------- | 4 | 1 | Reserved | 32, 29, 26, 23 |
| 4 | -------- | 4 | 2 | Reserved | 32, 29, 26, 23, 17 |
| 4 | -------- | 4 | 3 | Div. "Y" | 32, 29, 26, 23, 20 |
| 4 | -------- | 4 | 4 | Reserved | 32, 29, 26, 23, 20, 17 |

A brief description of the operation of Figures 1 and 2 will now be given, by tracing the path of a vehicle through the system. Thus, if dispatcher A, for example, wishes to dispatch a load to station 324, and to have the empty vehicle return to his own station, he has merely to set the selector switches 35, 36, 37 and 38, and then throw the power on the carrier by any means provided. Selector switch 35 will be set to its first point to select dispatcher station A, while the station hundreds switch 36 will be set on its "third" point, the tens switch 37 on its "second" point, and the units switch 38 on its "fourth" point.

The vehicle, on receiving power, starts out, and on passing off the siding A, goes on past the sidings B, C and D to track 43, past the division switch 443, and on into division X until it reaches branch track 324, where the collector shoes 10, 12, 14 and 16 will make contact simultaneously, or approximately so, with the trackside contact plates 9, 11, 13 and 15. Since station 324 has its marking plates connected as shown in Figure 1, negative half-cycle current will now flow from the ground bus 40 through collector shoe 39, the hundreds relay 32, the upper rectifier discs shunting relay 29, collector shoe 10, marking plate 9, and the rectifier discs of strap 2 to conductor 1. At the same time positive half cycles of current will flow from conductor 1, through the rectifier discs of strap 3, marking plate 11, collector shoe 12, tens relay 23, the lower rectifier discs shunting relay 26, and collector shoe 39 to the ground bus 40. Alternate cycles of alternating current also flow through the units relays 20 and 17 by way of strap 4, marking plate 13, and collector shoes 14 and 39.

The combination relays 32, 23, 20 and 17 thereupon operate and complete an alternating current circuit for the operation of the trackside relay 5. This circuit is as follows: bus 40, collector shoe 39, make contacts 33, point "three" in the center section of selector switch 36, the right hand contact arms of switch 36, point "three" in the right hand section of this switch, break contacts 30, break contacts 27, point "two" in the left half of selector switch 37, the two contact arms of this switch in series, point "two" in the right half of this switch, make contacts 24, make contacts 21, point "four" in the left half of selector switch 38, the two contact arms of this switch in series, point "four" in the right half of this switch, make contacts 18, collector shoe 16, track plate 15, and the winding of relay 5 to conductor 1.

Relay 5 thereupon operates and locks, and closes contacts 7 to operate the electrically driven track switch 324, and the vehicle turns into the associated branch track. After the vehicle has cleared the track switch, break contacts 8, located in the branch track, will be opened momentarily by the vehicle in its passage. Relay 5 will thereupon unlock and close break contacts 7 to reset the track switch for the main line. It should be understood of course that these track switches are provided with self reversing contacts or limit switches, which reverse at the extremity of a movement in either direction to stop the movement in that direction and prepare the movement in the opposite direction.

Upon arrival at handling station 324 in the branch track, the vehicle may be stopped automatically by a de-energized section in the power bus or trolley wire, or it may be stopped by an attendant pressing a button on the vehicle to disconnect the motor. The exact manner of starting and stopping is immaterial however, as far as the operation is concerned.

Upon being released from the branch track, by any convenient method, the vehicle proceeds to the right along track 45, up on track 46, and left on track 47 until it encounters track switch 431 giving access to the siding A. Referring now to Tables I and II it will be seen that a 4—3—1 marking from the track contact plates at this point on the carrier's collector shoes 10, 12, and 14, will cause the operation of combination relays 32, 29 and 26. These relays will thereupon complete a circuit for the operation of the trackside relay 5 at this point as follows: bus 40, collector shoe 39, make contacts 34, 31 and 28, break contacts 25 and 22, point "one" in the left half of selector switch 35, both contact arms in series, point "one" in the right half of switch 35, break contacts 19, collector shoe 16, a switching contact plate like 15, and the trackside relay to conductor 1. The trackside relay and track switch 431 thereupon operate and the vehicle passes into the siding, resetting the track switch automatically after clearing the points, just as described for handling station 324.

In a large system of this type, it is more than likely that the distribution of the returning vehicles to the dispatchers will be controlled from a supervisor's station S, located near the dispatchers' stations. In such a case, the dispatchers will not concern themselves with the dispatcher selector switch 35, but only with the switches 36, 37, and 38. If dispatcher A therefore, wishes to dispatch a vehicle to handling station 632 in division Y, he has only to set selector switch 36 on point "six," switch 37 on point "three," and switch 38 on point "two," and then start the vehicle. The vehicle will thereupon pass out of the siding A as before and proceed along track 43 until it reaches division switch 443. By referring again to Tables I and II it will be seen that a 4—4—3 marking on the track plates at this point will cause the operation of combination relays 32, 29, 26, 23 and 20. These relays will thereupon complete a circuit through the left arm of the hundreds switch 36 for the operation of the trackside relay 5 at this point as follows: bus 40, shoe 39, make contacts 34, 31, 28 and 25, point "six" in the left section of selector switch 36, the left contact arm of this switch, shoe 16, the trackside operating contact plate, and the trackside relay to conductor 1. The trackside relay and track switch 443 then operate, and the vehicle passes into division Y and proceeds to the right along track 44, until it reaches the track switch 632.

Tables I and II indicate that track plates with a marking 6—3—2 will cause the operation of combination relays 29, 26 and 17 on the vehicle. These relays therefore operate, as the vehicle reaches track switch 632, and close a circuit for the trackside relay 5 at this point through the right side of the hundreds switch 36 and through the tens and units switches 37 and 38 as follows: ground bus 40, shoe 39, break contacts 33, point "six" in the center section of selector switch 36, the center and right hand contact arms of this switch in series, point "six" in the right hand section of this switch, make contacts 30 and 27, point "three" in the left half of switch 37, both contact arms in series, point "three" in the right half of this switch, break contacts 24 and 21, point "two" in the left half of switch 38, point "two" in the right half of this switch, make contacts 18, and collector shoe 16 to contact plate 15 and the associated trackside relay 5. The trackside relay and track switch 632 thereupon operate and the vehicle passes into branch track 632.

Upon being released from branch track 632, the vehicle proceeds left on track 47 until it arrives at the supervisor's station S where it may stop or be stopped if necessary, until the supervisor sets the dispatcher switch 35 and releases it, whereupon it will proceed, and switch itself into the selected dispatcher's siding.

In Figure 3, the trackway equipment included by the bracket 84 is like that shown in Figure 1, except that this, being a smaller system, requires only "tens" and "units" marking plates, such as 57 and 59, the hundreds marking plate being omitted. The vehicle-borne equipment is also similar to that in Figure 1, except that only two pairs of combination relays are provided, and only three selector switches. The function of these selector switches is also slightly different. Selector switch 79 on the left for example, selects the handling track, selector switch 80 in the center selects a particular handling station on the selected branch track, and selector switch 81 on the right selects the dispatcher station.

Figure 4 shows a one-line diagram of a typical track layout for use with the circuits of Figure 3. On the right are four dispatchers' stations A, B, C and D located on branch tracks rather than sidings as in Figure 2, and on the left are a number of handling station branch tracks G, H, J, K, L, M, N, O and P, with four handling stations in each branch track. A track switch is provided at the entrance of each branch track except the last, and the vehicles move always in a clockwise direction around the system as indicated by the small arrows. No division switches are required, since there is only one division.

The number key for the stationary trackside connections to the combination marking plates, which are now required at the handling station locations as well as the trackswitch locations, is as given in the Table III following. The complete numbering scheme assumed for Figure 4 is given in Table IV following.

TABLE III

*Switch and Station Strapping*

| Strapping | Tens Digit | Units Digit |
|---|---|---|
| Through strap | 1 | 1 |
| Arrow Down | 2 | 2 |
| Arrow Up | 3 | 3 |
| Open | 4 | 4 |

TABLE IV

| Hand. Line | Sel. Switch | Switch Pos. | Trk. Strapping | | Relays Operated |
|---|---|---|---|---|---|
| | | | Tens | Units | |
| G | 79 | 1 | 1 | 1 | 75, 71, 67, 63 |
| H | | 2 | 1 | 2 | 75, 71, 67 |
| J | | 3 | 1 | 3 | 75, 71, 63 |
| K | | 4 | 1 | 4 | 75, 71 |
| L | | 5 | 2 | 1 | 75, 67, 63 |
| M | | 6 | 2 | 2 | 75, 67 |
| N | | 7 | 2 | 2 | 75, 63 |
| O | | 8 | 2 | 4 | 75 |
| P | | | | | |

| Hand. Station | Sel. Switch | Switch Pos. | Tens Strap | Units Strap | Relays Operated |
|---|---|---|---|---|---|
| 1 | 80 | 1 | 3 | 1 | 71, 67, 63 |
| 2 | | 2 | 3 | 2 | 71, 67 |
| 3 | | 3 | 3 | 3 | 71, 63 |
| 4 | | 3 | 3 | 4 | 71 |

| Disp. Station | Sel. Switch | Switch Pos. | Tens Strap | Units Strap | Relays Operated |
|---|---|---|---|---|---|
| A | 81 | 1 | 4 | 1 | 67, 63 |
| B | | 2 | 4 | 2 | 67 |
| C | | 3 | 4 | 3 | 63 |
| D | | | | | |

In tracing the operation of this system, let it be assumed first that dispatcher A wishes to dispatch a load to handling station H4, and have the empty vehicle return to his own station. To do this, the dispatcher will set selector switch 79 to its second position to select the track switch H, in accordance with Table IV, and will set selector switch 80 in its fourth position to select the fourth station, in this case station H4. The dispatcher will also at the same time set selector switch 81 to its first position, to select the track switch A, and will then apply power to the vehicle.

The vehicle thereupon passes out of the branch track A, down on track 90, and left on track 91, until it reaches the track switch H where the collector shoes 58, 60 and 62 will make contact with the trackside contact plates 57, 59 and 61. Since the combination marking plates 57 and 59 at this point are connected for a 1—2 marking as shown in Figure 3 (see Tables III and IV), the combination relays 75 and 71 will be operated by alternating current through strap 51, contact plate 57, and collector shoes 58 and 82. Combination relay 67 will also operate, from the positive half cycles of current passing through strap 52, contact plate 59, and collector shoes 60 and 82.

Relays 75, 71 and 67 upon operating, close a circuit to the trackside relay 53 as follows: ground bus 83, collector shoe 82, make contacts 78, left contact arm of selector switch 79, point "two" in the left section of this switch, make contacts 74 and 70, point "two" of the center section of selector switch 79, the center and right contact arms of this switch in series, point "two" of the right hand section of the switch, break contacts 66, collector shoe 62, track plate 61, and trackside relay 53 to conductor 50.

Relay 53 thereupon operates and locks through its make contacts 54 to ground at break contacts 56, and at the same time closes make contacts 55 to operate the track switch H, thereby causing the vehicle to turn in on the branch track H. When the vehicle has cleared the track switch, it opens the trackway break contacts 56, thereby unlocking relay 53, which thereupon releases and resets track switch H for main line operation.

The vehicle now proceeds along branch track H until it reaches handling station H4. Since the fourth station in each handling track has its combination marking plates connected as shown in the second part of Table IV, which indicates a 3—4 marking per Table III, combination relay 71 alone will operate at this point. Relay 71 will upon operating, complete a circuit for the trackside relay 53 at station H4, as follows: ground bus 83, collector shoe 82, break contacts 77, left contact arm of selector switch 80, point "four" of the left hand section of this switch, make contacts 73, break contacts 69, point "four" of the center section of selector switch 80, center and right hand contact arms of this switch in series, point "four" of the right hand section of the switch, break contacts 65, collector shoe 62, track contact plate 61, and relay 53 to conductor 50.

Relay 53 at station H4 now operates and locks, and at contacts corresponding to make contacts 55 closes a circuit to a "power off" relay, shown in dotted lines, which disconnects power from the track section facing the station H4, causing the vehicle to stop. Break contacts 56 in this case, represent a manually operated switch under the control of an attendant or workman at the handling station. To start the vehicle again, it is only necessary to operate switch 56 momentarily, to unlock relay 53 and release the power-off relay.

The vehicle now advances again under its own power, and on passing out of branch track H proceeds to the right on track 92 until it reaches track switch A. By reference to the third section of Table IV, it is seen that the track contact plates at this point have a 4—1 marking per Table III, which will cause combination relays 67 and 63 to operate. When relays 67 and 63 operate, they immediately close a circuit to the trackside relay 53 at this point as follows: ground bus 83, shoe 82, break contacts 76, point "one" in the left hand section of selector switch 81, left contact arm of this switch, break contacts 72, make contacts 68, point "one" in the center section of switch 81, center and right contact arms in series, point "one" in the right section of this switch, make contacts 64, collector shoe 62, track plate 61, and relay 53 to conductor 50. Trackside relay 53 upon operating, locks in the usual way and operates trackswitch A, to pass the vehicle back into the dispatcher branch track A, the vehicle resetting the switch as it advances, as previously explained. Upon arriving at the dispatcher's station, it may stop automatically due to a normally dead section of bus at this point or it may be stopped by the dispatcher operating a switch or a key or a push button, as preferred.

To dispatch a vehicle to handling track P, which must be the last branch track, the dispatcher will not set the handling track selecting switch 79, to any handling track but will set it rather on the normal or zero point. The vehicle will, therefore pass by all of the handling track switches without operating any of them, and will perforce, pass in onto track P since there is no track switch at this point, and will stop at any selected station on this track, according to the seting of selector switch 80. Similarly, to route a vehicle back to dispatching track D, it is only necessary to set selector switch 81 on the zero point, and the vehicle will pass by the track switches A, B and C on its return journey, and enter track D.

The trackside contacts and the carriage contacting shoes in the upper part of Figures 1 and 3 have been shown in a straight line in the direction of the trackway for convenience only. In the application of the invention, it will be obvious that such an arrangement might cause false operations, should the combination shoes such as 14, 12 and 10 be allowed to brush over track contact 15. It is therefore contemplated that the trackside contacts would normally be placed side by side, or staggered, so as to avoid unnecessary operations of the combination relays, as well as the aforementioned possible false operation of the trackside relay. For similar reasons, the operate trackside contacts 15 and 61 should be made shorter than the other contacts, and so set in relation to them that contact is made with said contacts 15 and 61 by the operate shoe on the carriage, only after the combination relays on the carriage have operated, and is broken before the combination relays start to release.

What is claimed is:

1. In an electric conveyor system, a track, a self propelled vehicle moving along said track, a first group of branch tracks, a plurality of receiving stations in each branch track of said first group, a second group of branch tracks, a dispatching station in each branch track of said second group, a carriage stopping means at each receiving station and a track switching means at the entrance to each branch track, a switching point at each branch track entrance and a stopping point at each receiving station, a plurality of sets of relays on said vehicle, contacting shoes carried on said vehicle and each shoe connected to a corresponding relay set, contacts on said vehicle relays, track contacts corresponding respectively to said shoes at each switching and stopping point marked electrically in different ways to cause the operation of said relay sets in different combinations as said contacting shoes simultaneously engage the corresponding track contacts, a different combination of said vehicle relays being operated at each switching and stopping point responsive to such engagement, combination circuits also corresponding to said switching and stopping points being partially completed through the contacts of said vehicle relay sets in response to the operation of each relay combination, said combination circuits comprising a first group of combination circuits corresponding respectively to said receiving station switching points, a second group of combination circuits corresponding respectively to said receiving station stopping points, and a third group of combination circuits corresponding respectively to said dispatching station switching points; a first manually operated preselecting means on said carriage for completing one of said partially completed combination circuits in said first group of circuits to effect the operation of the track switching means at the entrance to a preselected one of said receiving station branch tracks, a second manually operated preselecting means on said carriage for completing one of said partially completed combination circuits in said second group of circuits to effect the operation of the vehicle stopping means at a preselected one of said receiving stations, and a third manually operated preselecting means on said carriage for completing one of said partially completed combination circuits in said third group of circuits to effect the operation of the track switching means at the entrance to a preselected one of said dispatching station branch tracks.

2. In a conveyor system, a track, a carriage propelled along said track, a plurality of receiving station branch tracks, a first and a second division including different ones of said receiving station branch tracks, a plurality of dispatching station branch tracks, a trackswitch at the division entrance point and at the entrance to each branch track, a plurality of relay sets on said carriage, a track contact at each trackswitch location for each said relay set on said carriage, means for causing the operation of said relay sets in different combinations from said trackside contacts upon the arrival of said carriage at the corresponding trackswitch location, a different combination of said relays being operated at each said trackswitch location, a first group of contacts on said vehicle-borne relay sets, a first group of circuits connected to said first group of relay contacts and corresponding respectively to said receiving station branch trackswitches, a second group of contacts on said vehicle-borne relay sets, a second group of circuits connected to said second group of relay contacts and corresponding respectively to said dispatching station branch track switches, an additional circuit connected to said second group of contacts and corresponding to said division entrance trackswitch, a plurality of hand operated preselecting devices on said carriage for determining which of said first group of circuits will be preselected to control the entrance trackswitch at a preselected one of said receiving branch tracks, means on one of said same preselecting devices when in certain of its positions for also preselecting said additional circuit to control the division entrance trackswitch, an additional hand operated preselecting device for determining which of said second group of circuits will be preselected to control the entrance trackswitch at a preselected one of said dispatching station branch tracks, and means for completing said preselected circuits and thereby operating the respective associated trackswitches automatically whenever said carriage reaches said respective preselected trackswitches.

3. In a conveyor system, a track, a carriage propelled along said track, a plurality of contacting shoes on said carriage, a plurality of relay sets on said carriage, each set connected to a different one of said contacting shoes, a plurality of switching points along said track, a plurality of trackside contact members at each of said switching point, the same number of contact members being used at each switching point, each of the said trackside contact members at each switching point being marked with any one of a plurality of different electrical potentials, different combinations of the said potentials being employed at each switching point, a single digit number assigned to each one of said plurality of electrical potentials so that each potential combination may be represented by a plural digit number having a digit for each of said respective trackside contact members at each switching point to identify said switching points, means including said contacting shoes effective as said carriage arrives at each switching point for causing said relay sets to operate simultaneously from said trackside contact members in different combinations corresponding to said switching points and said corresponding plural digit numbers, contacts on said relay sets, a group of circuits through the contacts of each of said relay sets for controlling switching operations at said switching points and each circuit corresponding respectively to the different digits of said identifying switching point numbers, a hand operated preselecting device on said carriage for each said relay set, said preselecting devices being set in advance in accordance with said identifying switching point numbers to preselect certain of said circuits in each said circuit group and connect them together to prepare a switching operation at a preselected one of said switching points, and means including a switching control contacting shoe on said carriage for completing a circuit through said prepared circuits at said preselected switching point upon the arrival of said carriage at said preselected switching point and the operation of said relay sets, thereby to complete a switching operation at said preselected switching point.

4. In a conveyor system, a track including branch tracks, entrance switches for said branch tracks, a vehicle moving along said track, a source of alternating current, trackside contact plates at each switch location corresponding in number and position with those of every other switch location, trackside rectifier means, cross-connecting means between said source and said contact plates, whereby each of said contact plates may be connected to said source either directly or through rectifier means interposed in one direction of conductivity or through rectifier means interposed in the opposite direction of conductivity to setup at each switch location a characteristic potential combination, contact shoes on said vehicle corresponding in number and position to the contact plates at said switch locations, a plurality of groups of relays and associated rectifiers on said vehicle, each group connected separately to one of said contact shoes so that the relays of each group are operated by said simultaneously engaged contact plates in a different combination at each switch location, contacts on said relays, circuits through said contacts corresponding to said relay combinations, hand operated means on said vehicle presettable to prepare predetermined ones of said circuits, and means to complete said circuits through said contacts and said presettable means, and to operate preselected ones of said entrance switches thereover for directing said vehicle into the associated branch track, whenever the operated relay combination coincides with the setting of said hand operated means.

5. In a conveyor system, a track, a carriage propelled along said track, switching points along said track, receiving stations associated with some of said switching points and dispatching stations associated with others of said switching points, trackside contacts at each switching point and contacting shoes on said carriage for engaging them momentarily in passing, the trackside contacts at each switching point being identical in both number and relative position with those of every other switching point and with said shoes, potential sources of different polarity characteristics, trackside cross-connecting means for separately connecting the individual trackside contacts at each switching point to any one of said potential sources, thereby to set up a characteristic combination of potentials at each switching point, a plurality of relay groups on said carriage, each of said relay groups being connected to one of said contacting shoes and the relays within each group having uni-directional circuit elements associated therewith to cause the relays within a group to operate selectively depending on the polarity characteristic of the potential encountered by the contacting shoe upon its engagement with a corresponding trackside contact; contacts on said relays, a first group of circuits connected to said relay contacts and corresponding respectively to said receiving station switching points, a second group of circuits connected to said relay contacts and corresponding respectively to said dispatching station switching points, manually operated preselecting devices on said carriage for preselecting one of said first group of circuits to control a switching operation at a predetermined one of said receiving stations, a different manually operated preselecting device on said carriage for preselecting one of said second group of circuits to control a switching operation at a predetermined one of said dispatching stations, a switching shoe on said carriage, a trackside switching contact element at each switching point; and means including said switching shoe and trackside switching contact element for completing said preselected circuits through said relay contacts and said preselecting devices in series to effect said switching operations whenever said carriage reaches said respective preselected switching points and engages all of the said contacts thereat.

6. In a conveyor system, a track, a vehicle self-propelled along said track, a plurality of branch tracks along said track, entrance switches for said branch tracks, a set of trackside contact members at each switch location, potential sources of different polarity characteristics, trackside cross-connecting means for separately connecting the individual trackside contact members of each set to any one of said potential sources, thereby to mark each set with a given combination of potentials, a corresponding set of contact shoes on said vehicle, said contact shoes being relatively positioned for concurrent engagement with the individual contact members of any set, a corresponding set of relay groups on said vehicle, each of said relay groups being connected to one of said contact shoes and the relays within each group having uni-directional circuit elements associated therewith to cause the relays within a group to operate selectively depending on the polarity characteristic of the potential encountered by the contact shoe upon its engagement with a corresponding contact member, whereby the relays on the vehicle are operated in varying combinations each time the vehicle approaches an entrance switch, contacts on said relays, manually preset preselecting means on said vehicle for interconnecting the contacts of the relays on the vehicle in a pattern characteristic of a desired entrance switch, and an entrance switch operating circuit completed through said relay contacts and said manual preselecting means whenever the setting of said cross-connecting means and the setting of said manual preselecting means correspond to each other.

7. In a material handling system, a track, a carriage moving along said track, a plurality of switching points located at intervals along said track, a set of trackside contact members at each switching point, potential sources of different polarity characteristics, trackside cross-connecting means for separately connecting the individual trackside contact members of each set to any one of said potential sources, thereby to mark each set with a given combination of potentials, a corresponding set of contact shoes on said carriage, said contact shoes being relatively positioned for concurrent engagement with the individual contact members of any set, a corresponding set of relay groups on said carriage, each of said relay groups being connected to one of said contact shoes and the relays within each group having uni-directional circuit elements associated therewith to cause the relays within a group to operate selectively depending on the polarity characteristic of the potential encountered by the contact shoe upon its engagement with a corresponding contact member, whereby the relays on the carriage are operated in varying combinations each time the carriage approaches a switching point, contacts on said relays, manually pre-set preselecting means on said carriage for interconnecting the contacts of the relays on the carriage in a pattern characteristic of a desired switching point, a switching shoe on said carriage, a trackside switching contact at each switching point, and a circuit closed through said manual preselecting means and the contacts of said combinationally operated relays in series responsive to the engagement of said switching shoe and said switching contact at a preselected switching point for causing a track switch operation at said preselected switching point, the range of engagement, lengthwise of said track, between said switching shoe and said switching contact being shorter at the leading end thereof than the range of engagement between said contact shoes and contact members over which said relays are operated, whereby said switching circuit is closed subsequent to the closure of said relay operating circuits, and track switching operations in response to incompletely setup relay combinations are avoided.

8. In a material handling system, a track, a carriage moving along said track, a plurality of switching points located at intervals along said track, a set of trackside contact members at each switching point, potential sources of different polarity characteristics, trackside cross-connecting means for separately connecting the individual trackside contact members of each set to any one of said potential sources, thereby to mark each set with a given combination of potentials, a corresponding set of contact shoes on said carriage, said contact shoes being relatively positioned for concurrent engagement with the individual contact members of any set, a corresponding set of relay groups on said carriage, each of said relay groups being connected to one of said contact shoes and the relays within each group having uni-directional circuit elements associated therewith to cause the relays within a group to operate selectively depending on the polarity characteristic of the potential encountered by the contact shoe upon its engagement with a corresponding contact member, whereby the relays on the carriage are operated in varying combinations each time the carriage approaches a switching point, contacts on said relays, manually preset preselecting means on said carriage for interconnecting the contacts of the relays on the carriage in a pattern characteristic of a desired switching point, a switching shoe on said carriage, a trackside switching contact at each switching point, and a circuit closed through said manual preselecting means and the contacts of said combinationally operated relays in series responsive to the engagement of said switching shoe and said switching contact at a preselected switching point for causing a track switch operation at said preselected switching point, the range of engagement, lengthwise of said track, between said switching shoe and switching contact being shorter at both the leading and trailing end thereof than the range of engagement between said contact shoes and contact members over which said relays are operated, whereby said switching circuit is closed subsequent to the closure of said relay operating circuits and is opened prior to the opening of said relay operating circuits, and track switching operations in response to incompletely setup or partially released relay combinations are avoided.

KURT MULLERHEIM.

REFERENCES CITED

The following references are of record in the file of this patent:

UNITED STATES PATENTS

| Number | Name | Date |
|---|---|---|
| 1,208,060 | Weller et al. | Dec. 12, 1916 |
| 1,243,457 | Stuart | Oct. 16, 1917 |
| 1,381,317 | Loughridge | June 14, 1921 |
| 2,176,458 | Goddard | Oct. 17, 1939 |
| 2,194,057 | Simpson | Mar. 19, 1940 |
| 2,298,840 | Purcell | Oct. 13, 1942 |
| 2,320,150 | Loughridge | May 25, 1943 |
| 2,486,222 | Spafford | Oct. 25, 1949 |

FOREIGN PATENTS

| Number | Country | Date |
|---|---|---|
| 23,533 of 1909 | Great Britain | Mar. 3, 1910 |
| 314,112 | Great Britain | June 24, 1929 |